Figure 1:
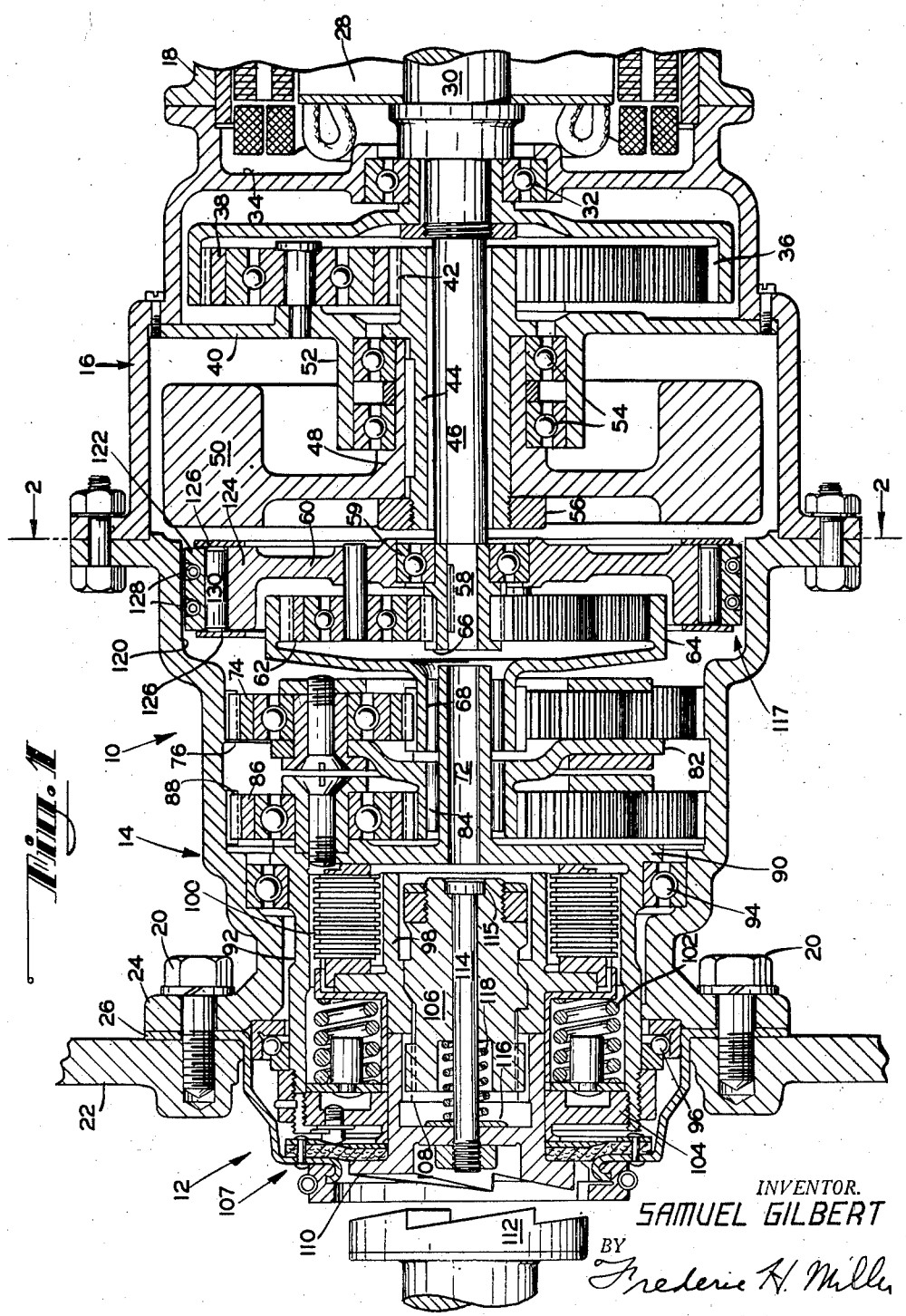

Jan. 4, 1949.　　　　S. GILBERT　　　　2,458,070
TRANSMISSION MECHANISM FOR ENGINE
STARTERS AND THE LIKE

Filed July 30, 1947　　　　2 Sheets-Sheet 1

INVENTOR.
SAMUEL GILBERT
BY
Frederic H. Miller
-ATTORNEY-

Jan. 4, 1949.  S. GILBERT  2,458,070
TRANSMISSION MECHANISM FOR ENGINE
STARTERS AND THE LIKE
Filed July 30, 1947  2 Sheets-Sheet 2

INVENTOR.
SAMUEL GILBERT
BY
Frederic H. Miller
—ATTORNEY—

Patented Jan. 4, 1949

2,458,070

UNITED STATES PATENT OFFICE 2,458,070

TRANSMISSION MECHANISM FOR ENGINE STARTERS AND THE LIKE

Samuel Gilbert, Cedar Grove, N. J., assignor to Bendix Aviation Corporation, Teterboro, N. J., a corporation of Delaware Application July 30, 1947, Serial No. 764,761

4 Claims. (Cl. 123—179)

The present invention relates to transmission mechanisms, and particularly to a mechanism, in which an output member is adapted to be operatively connected to, and disconnected from, an element to be driven, as in an engine starter having an output jaw for cooperation with an engine jaw.

An object of the invention is to provide novel means which, after the aforesaid operative connection is effected, is responsive to a predetermined speed of driving means for the output member, to transmit driving movement of the driving means to the element to be driven.

Another object is to apply the principle of the above stated object to a starter having inertia means as a driving means, in response to the attainment of a predetermined speed of which the operative connection is effected.

Another object is to provide a mechanism of the above-indicated character which is simple and durable in construction, economical to manufacture, and effective in its operation.

Further objects of the invention are to simplify the starting technique of aircaft engines, eliminate guess work, as in timing the speed of an inertia member, and avoid the requirement for solenoids and other exterior controls.

The above and other objects and features of the invention will appear more fully hereinafter from a consideration of the following description taken in connection with the accompanying drawing wherein one embodiment of the invention is illustrated by way of example.

Figure 2:
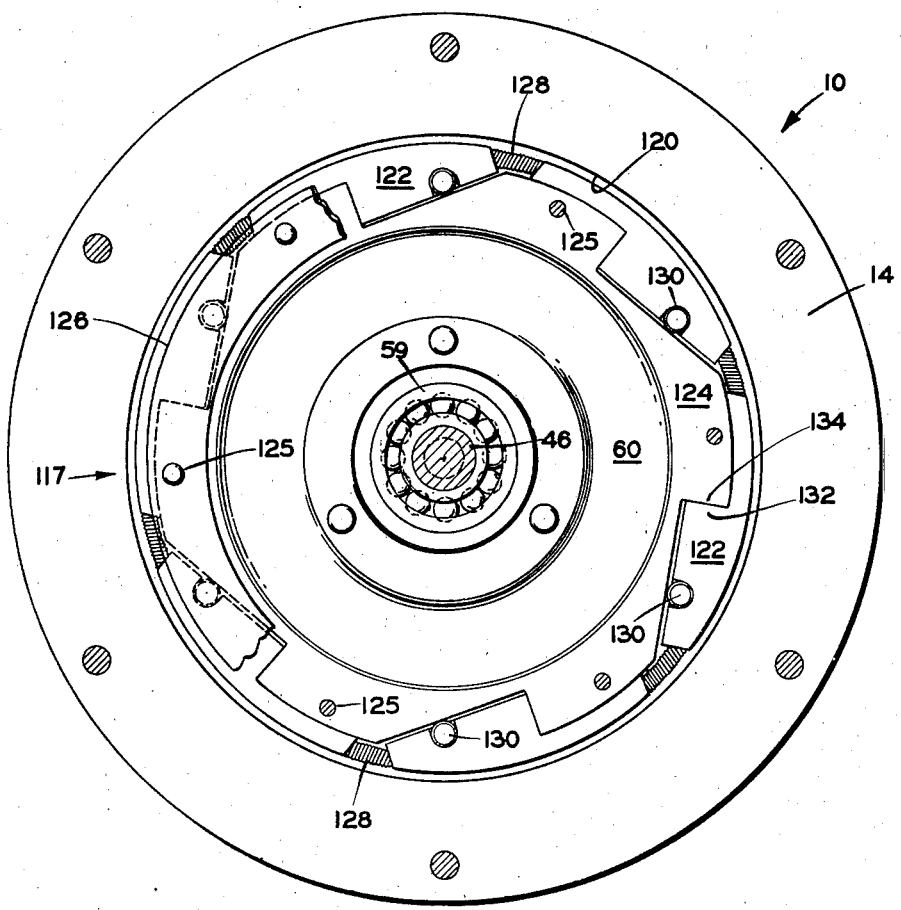

In the drawing:

Figure 1 is a side view, generally in section, but having parts in elevation, of an engine starter embodying one form of the invention; and Figure 2 is a detail view taken substantially along the line 2—2 of Figure 1.

As shown in Figure 1, which illustrates only so much of the structure, as believed necessary to an understanding of the invention, the device comprises an engine starter housing 10 comprising an end baffle 12, a portion 14, and a portion 16 secured to the portion 14 and supporting a motor housing 18. The housing 10 is adapted to be mounted by studs 20 on an engine crank case 22, which studs 20 extend through a flange 24 on the portion 14 and through a flange 26 on the baffle 12 into the case 22.

A rotatable motor armature element 28 has a shaft 30, journaled by a bearing 32 in a wall 34 of the housing portion 16, and fixed to an orbital gear 36 enclosing planet gears 38 supported by a partition 40 of the housing portion 16 and meshing with the gear 36 and a sun gear 42 on the partition 40. The latter has a tubular shaft 44, loosely surrounding a reduced portion 46 of the shaft 30, and itself surrounded by a sleeve 48 of a flywheel 50.

The partition 40 has a sleeve 52 telescoping the sleeve 48 and enclosing bearings 54 between the sleeves. A nut 56 maintains the flywheel 50 and the bearings 54 in position.

The portion 46 of the shaft 30 terminates, at the left as shown, in a portion 58 of further reduced diameter, and has a bearing 59 which supports a carrier 60 for planet gears 62 meshing with an orbital gear 64 and with a sun gear 66 keyed to the portion 58. The orbital gear 64 has a sleeve-like sun gear portion 68 journaled, as by needle bearings, on a hollow shaft 72 aligned with the shaft 30.

The sun gear portion 68 meshes with planet gears 74, which mesh with an orbital gear 76 on the housing portion 14. The planet gears 74 are mounted on a carrier 82 also having a sleeve-like sun gear 84 journaled about the shaft 72 and meshing with planet gears 86, which engage a second orbital gear 88 on the housing 14 and are carried on an end wall 90 of a barrel 92 journaled as by bearings 94 and 96 in the housing portion 14. A spline nut 98, in the barrel 92, is connected to the latter by a torque limiting friction disc pack 100 having interlayered discs fixed to the nut 98 and the barrel 92, respectively, and axially biased together, as by springs 102 held in adjusted relation to each other, as by a ring nut 104 threaded in the opposite end of the barrel 92.

A screw shaft 106, having long lead screw thread relation to the nut 98 therein, has an axially slidable spline connection 108 to a starter clutch jaw member 110, which is adapted to engage an engine jaw clutch element 112.

The jaw 110 and the screw shaft 106 are connected, in this instance, by a mesh rod 114 having a head 115 and extending through an aperture in the jaw 110, which aperture is closed by a seal 116 biased against the jaw 110 by a spring 118 extending into the screw shaft 106.

The screw shaft 106 is limited in its axial movement to the right, as viewed in the drawing, by engagement with the barrel end wall 90 and, in its axial movement, to the left, by engagement of a usual shoulder on the screw shaft 106 with a shoulder on the spline nut 98. A friction and seal structure 107, not germane to the present invention, cooperates between the baffle 12 and the jaw member 110.

The invention, for use in combination with the above-described structure, comprises a brake 117 including an internal brake drum portion 120 of the housing 14 enclosing brake shoes 122 carried by a cam 124 which constitutes part of the carrier 60. The shoes 122 are axially held to the cam 124, as by side plates or rings 126 secured to the carrier 60, as by bolts or rivets 125. The shoes 122 are normally radially held in brake release position, as by garter springs 128 in grooves of the shoes maintaining the springs out of contact with the braking surface of the drum 120. The shoes 122, which are mounted on rollers 130 on the cam 124, have shoulders 132 engaging shoulders 134 of the cam to limit the one and the same backward, radially inward or brake release movement of the shoes. The braking movement of the shoes, in this instance, is such that the shoulders 132 and 134 separate in response to predetermined counterclockwise rotation of the cam 124, with the result that the effective radius of each shoe from the axis of the drum 120 is increased, against the action of the springs 128, until the shoes effectively grip the drum 120.

In operation, when the motor armature 28 is energized, rotation of the shaft 30 is transmitted directly to the sun gear 66, and indirectly, or through the step-up gears 36, 38 and 42, to the flywheel 50.

While the flywheel 50 is thus being brought up to speed, and before attaining a predetermined speed, the rotation of the various gears to the left of the carrier 60 is sufficient such that the screw shaft 106 and the jaw 110 are advanced axially to the left. In the latter movement, the screw shaft 106 acts through the spring 118 to cause the jaw 110 to engage the jaw 112, upon which action, the rotation of the orbital gear 64 is stopped, and the planet carrier 60 and its planets 62 continue to rotate. The engagement, at this time, of the starter jaw 110 to the engine jaw 112 is accomplished without shock loading, or at zero speed zero torque.

When the flywheel 50 attains its predetermined speed, which in this instance is effected in about twelve seconds, the shoes 122 overcome the springs 128 to engage the brake drum 120, thus stopping rotation of the carrier 60, and causing the sun gear 66 to rotate the planets 62 and the orbital gear 64, which rotation is transmitted in a usual manner through the remaining gears to the jaw 110.

At the moment the shoes 122 of the brake 117 grip the drum 120, all of the stored energy of the flywheel 50, the armature 28 and other of the rotating parts, is transmitted to the engine jaw 112, and energization of the motor is continued until the engine starts.

A current inertia starter, of prior practice, employs a two-position switch, one position for acceleration, and the other for meshing the starter jaw, which system usually requires the employment of a meshing solenoid, and renders it possible to overspeed the flywheel, with resultant excessive battery current consumption and high stresses on all mechanical parts.

Underspeeding the flywheel does not give consistant starting and is undesirable in other ways.

By the present invention, all of the disadvantages of the current inertia starter of prior practice, including those above set forth, are avoided and a novel and useful starter provided which is a distinct advance in its field.

Although only one embodiment of the invention has been illustrated and described, various changes in the form and relative arrangements of the parts may be made to suit requirements.

What is claimed is:

1. An engine starter transmission mechanism comprising a motor, a flywheel, an engine-engaging member, means responsive to rotation of said motor to move said member while substantially torque free to engine-engaging position, including a planetary gear train having an orbital element which because of said torque free condition is brought to a stop by said member when the latter reaches said position and a planet carrier which continues to rotate with said motor, means drivably connecting said motor and flywheel, and means responsive to a predetermined speed of said flywheel after said member reaches said engine-engaging position for stopping rotation of said carrier to cause the rotation of said motor and flywheel to be transmitted to said engine-engaging member through the intermediary of said orbital element.

2. An engine starter transmission mechanism comprising an engine engaging member, rotatable driving means, means responsive to rotation of said driving means to move said member while substantially torque free to engine engaging position, including a planetary gear train having an orbital element which because of said torque free condition is brought to a stop by said member when the latter reaches said position and a planet carrier which continues to rotate with said driving means, and means responsive to a predetermined speed of said driving means after said member reaches said engine-engaging position for stopping rotation of said carrier to cause the rotation of said driving means to be transmitted to said engine-engaging member through the intermediary of said orbital element.

3. A transmission mechanism comprising a driving member, rotatable driving means, means responsive to rotation of said driving means to move said member while substantially torque free to position operatively connected to a driven element, including a planetary gear train having an orbital element which because of said torque free condition is brought to a stop by said member when the latter reaches said position and a planet carrier which continues to rotate with said driving means, and means responsive to a predetermined speed of said driving means after said member reaches said position for stopping rotation of said carrier to cause the rotation of said driving means to be transmitted to said member through the intermediary of said orbital gear.

4. A transmission mechanism comprising a driving member, driving means, means responsive to movement of said driving means to move said member while substantially torque free to position operatively related to a driven element, including a first element which because of said torque free condition is brought to a stop by said member when the latter attains said operative relation and a second element which continues to move with said driving means, and means responsive to a predetermined speed of said driving means after said member attains said relation for stopping movement of said second element to cause the movement of said driving means to be transmitted to said member through the intermediary of said first element.

SAMUEL GILBERT.

REFERENCES CITED

The following references are of record in the file of this patent:

UNITED STATES PATENTS

| Number | Name | Date |
| --- | --- | --- |
| 1,949,203 | Havill | Feb. 27, 1934 |
| 1,963,590 | Penney | June 19, 1934 |
| 2,116,234 | Cotterman | May 2, 1938 |
| 2,374,990 | Gilbert | May 1, 1945 |